United States Patent [19]

Moriguchi et al.

[11] Patent Number: 4,553,174
[45] Date of Patent: Nov. 12, 1985

[54] DRIVE DEVICE IN A PLANE READING DEVICE

[75] Inventors: Fujio Moriguchi; Masami Kurata, both of Kanagawa, Japan

[73] Assignee: Fuji Xerox Co., Ltd., Tokyo, Japan

[21] Appl. No.: 455,365

[22] Filed: Jan. 3, 1983

[30] Foreign Application Priority Data

Jan. 8, 1982 [JP] Japan .................................. 57-913

[51] Int. Cl.⁴ .............................................. H04N 1/04
[52] U.S. Cl. .................................... 358/285; 358/293
[58] Field of Search ............... 358/256, 285, 293, 289; 346/139 R, 139 B; 400/320, 322

[56] References Cited

U.S. PATENT DOCUMENTS 2,330,386  4/1943  Rudd et al. .................... 358/289
4,262,311  4/1981  Tachikawa et al. ............. 358/289

*Primary Examiner*—Edward L. Coles, Sr.
*Attorney, Agent, or Firm*—Sughrue, Mion, Zinn, Macpeak, and Seas

[57] ABSTRACT

A reading mechanism of a plane reading device is provided with a rack and pinion drive mechanism with a step motor as the driving source. Backlash and vibration are prevented by applying a biasing force on the reading mechanism in a direction opposite that of the movement thereof.

6 Claims, 3 Drawing Figures

DRIVE DEVICE IN A PLANE READING DEVICE

BACKGROUND OF THE INVENTION

This invention relates to a drive mechanism for a plane reading device.

In a plane reading device for a copying machine or the like, an original is placed on the platen, which is fixed, and then a reading mechanism set above or below the platen is moved parallel to the platen, to read the image data of the original. One example of the drive device of a reading mechanism of a conventional plate reading device is as shown in FIG. 1. The reading mechanism 2 is arranged below a platen 1 in such a manner as to be movable along a guide rail 3 in parallel with the platen 1. When a stepping motor 4 is driven, drive force is transmitted through a transmitting member 5 comprising a wire or belt to a driving pulley 6, so that the reading mechanism 2 is moved in parallel with the platen 1 by a transmitting member 8 which is laid over the driving pulley 6 and a driven pulley 7.

In the conventional drive device, the transmitting member 5 and 8 are made of a flexible wire or belt. Therefore, the drive device is disadvantageous in that, when the reading mechanism 2 is moved stepwise, the transmitting members 5 and 8 are expanded slightly, as a result of which, when the stepping motor 4 has stopped, the reading mechanism 2 is vibrated, thus degrading the quality of the read image. In order to overcome this difficulty, a plane reading device has been proposed in the art, in which cylindrical frictional members 9 of felt or the like are interposed between the reading mechanism 2 and the guide rail 3, to damp the vibration of the reading mechanism 2. However, the plane reading device is still disadvantageous in that the frictional member 9 obstructs the movement of the reading mechanism; i.e., it is difficult to smoothly move the reading mechanism 2 because of the frictional member 9. As a result, the time required for movement in each stepping operation becomes longer, and accordingly it becomes difficult to read image data at high speed.

SUMMARY OF THE INVENTION

In view of the foregoing, an object of this invention is to provide a drive device for a plane reading device, which can smoothly step the reading mechanism without vibrating the same.

DETAILED DESCRIPTION OF THE PREFERRED EMBODIMENTS

Figure 1:
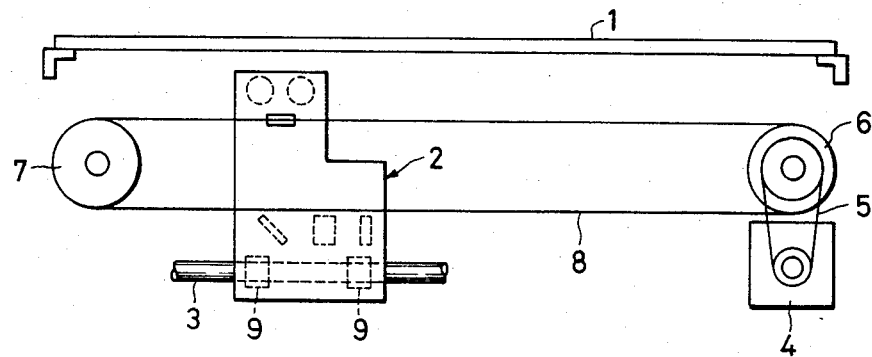
FIG. 1 is a diagrammatic side view showing one example of a conventional drive device for a plane reading device.
Figure 2:
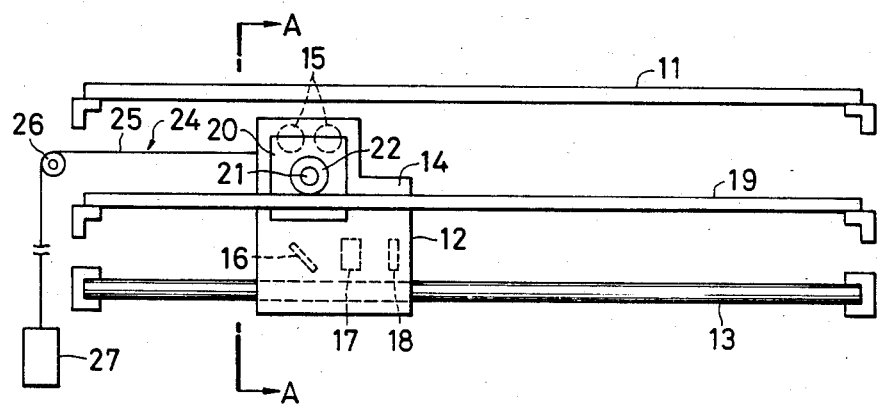
FIG. 2 is a diagrammatic side view showing one example of a drive mechanism for a plane reading device according to this invention.
Figure 3:
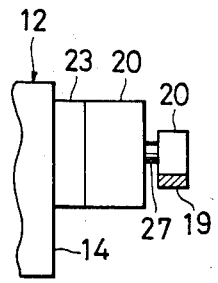
FIG. 3 is a fragmentary sectional view taken along line A—A of FIG. 2.

One example of a drive device for a reading device according to the invention will be described with reference to FIGS. 2 and 3. A reading mechanism 12 is provided below a platen 11 made of a flat glass plate in a manner such that it is movable along a guide rail 13 and in parallel with the platen 11. The reading mechanism 12 has a casing 14 which incorporates lamps 15, a mirror 16, a lens 17 and a reading element 18. As the reading mechanism 12 is moved as described later, an original (not shown) placed on the platen 11 is irradiated by the lamps 15, and light reflected from the original thus irradiated is applied through the mirror 16 and the lens 17 to the reading element 18, so as to be converted into an electrical signal (an image signal).

A rack 19 is disposed below the platen 11 in a manner such that it is parallel to the platen 11. A stepping motor 20 is provided outside of the casing 14 of the reading mechanism. A pinion 22 is mounted on the output shaft 21 of the stepping motor 20, and is engaged with the rack 19. An electromagnetic brake 23 is provided on the other side of the stepping motor 20, which is opposite to the side where the output shaft 21 is provided. The electromagnetic brake 23 operates to brake the stepping motor 20 when the latter is stopped, and to release the stepping motor 20 when the latter is started.

The reading mechanism 12 is provided with a backlash eliminating mechanism 24. The mechanism 24 comprises a wire 25, one end of which is fastened to the casing 14, a guide roller 26 for guiding the wire 25; and a weight 27 connected to the other end of the wire 25. The mechanism 24 operates to pull the reading mechanism 21 in the "return" direction, thereby eliminating backlash which may occur between the rack 19 and the pinion 22.

The operation of the drive device thus constructed will now be described. As a drive pulse is applied to the stepping motor 20, the reading mechanism 12 is moved by one step through engagement of the rack 19 and the pinion 22. During thus movement, the electromagnetic brake 23 is not operated to brake the stepping motor 20. In this operation, the backlash eliminating mechanism 24 pulls the reading mechanism in a direction opposite to the direction of movement, so that no backlash occurs between the rack 19 and the pinion 22. When the stepping motor 20 is started, the braking operation of the electromagnetic brake 23 is released. The above-described operation is carried repeatedly, and while the stepping motor 20 and accordingly the reading mechanism 12 are maintained stopped, the image data of an original on the platen 11 are read by the reading mechanism 12.

As is apparent from the above description, a little before the stepping motor 20 (which has been started) is stopped, the electromagnetic brake 23 brakes the motor 20 and no backlash is caused between the rack 19 and the pinion 22 owing to the backlash eliminating mechanism 24. Accordingly, when the stepping motor 20 is stopped, the reading mechanism 12 is quickly stopped in place without vibration. When the reading mechanism 12 is moved by the stepping motor 20, the electromagnetic brake 23 is not in operation. Accordingly, the electromagnetic brake 23 does not obstruct the movement of the reading mechanism 12 at all, and the reading mechanism 12 can be smoothly and quickly moved.

In the above-described example, an electromagnetic brake 23 is employed; however, the invention is not limited thereto or thereby. That is, any means may be employed, if it performs the same function as the electromagnetic brake 23. Furthermore, in the above-described example, the backlash eliminating mechanism 24 comprises the wire 25 and the weight 27, however, this may be replaced by a simple spring or the like.

In the drive device of the plane reading device according to the invention, as described above, the reading mechanism is provided with a stepping motor, so that the reading mechanism is moved through the rack and pinion by the stepping motor, and the stepping motor is braked shortly before being stopped and no backlash is caused between the rack and the pinion. Accordingly, the reading mechanism can be moved stepwise without vibration, resulting in an improvement in the quality of read image data. As the reading mechanism can be quickly stepped, the reading speed is increased.

What is claimed is:

1. In a plane reading device in which the image data of an original placed on a platen are read by a reading mechanism moved with respect to said platen; a drive device comprising:

a rack arranged parallel to said platen;
   a stepping motor provided on said reading mechanism;
   a pinion mounted on an output shaft of said stepping motor and engaged with said rack; and
   a backlash eliminating mechanism for eliminating backlash between said rack and said pinion.

2. A device as claimed in claim 1, wherein said stepping motor moves said reading mechanism when energized, said device further comprising a braking mechanism for applying a braking force to said motor before said motor is deenergized.

3. A device as claimed in claim 1, wherein said backlash eliminating mechanism comprises means for biasing said reading mechanism in a direction opposite a scanning direction thereof.

4. A device as claimed in claim 3, said biasing means comprising weight means attached to said reading mechanism via a wire.

5. A device as claimed in claim 3, said biasing means comprising spring means.

6. A device as claimed in claim 1, wherein said motor moves said reading mechanism when energized, said device further comprising a braking mechanism for intermittently applying a braking force to said motor.

* * * * *